May 8, 1962  D. W. PROWSE ET AL  3,033,347
ELECTRIC CONTROL OF CONVEYOR PLANTS
Filed Oct. 1, 1959
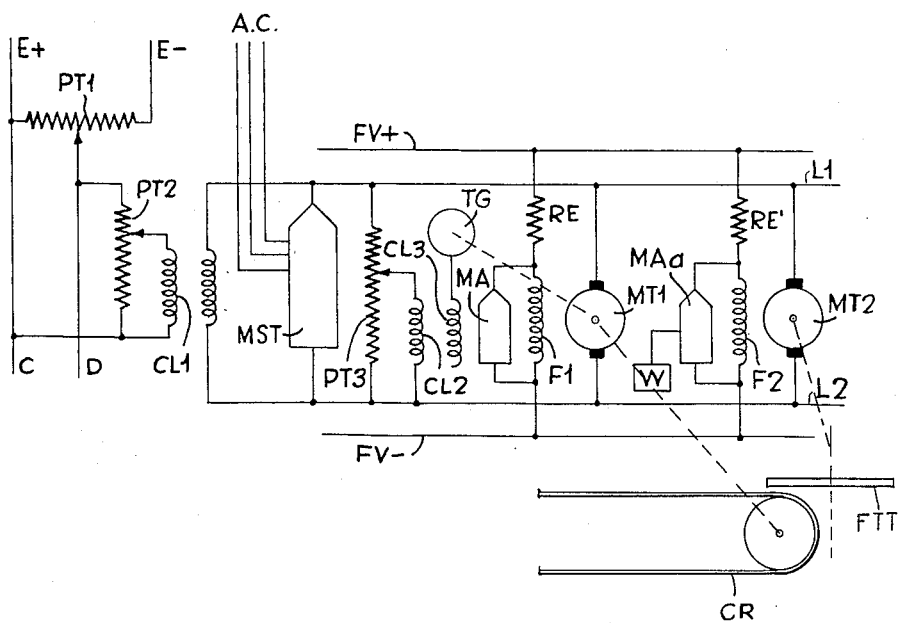
INVENTORS
DONALD W. PROWSE
RAYMOND G. RAYDEN
ATTORNEY United States Patent Office 3,033,347
Patented May 8, 1962

3,033,347
ELECTRIC CONTROL OF CONVEYOR PLANTS
Donald Windsor Prowse and Raymond Georges Rayden, Rugby, England, assignors to The British Thomson-Houston Company Limited, London, England, a company of Great Britain
Filed Oct. 1, 1959, Ser. No. 843,788
Claims priority, application Great Britain Oct. 2, 1958
7 Claims. (Cl. 198—76)

This invention relates to the control of conveyor delivery and aims at providing a combined electric control which will ensure that the action of a feeder supplying a conveyor is automatically responsive to a change in the speed of the conveyor. If the speed of the conveyor is increased or decreased the discharge from the conveyor increases or decreases only if at the same time the rate of feeding to the conveyor is increased or decreased in accordance with the speed change of the conveyor. Such dependent control can be achieved by a means which is sensitive to the weight of material carried per unit length of the conveyor. However, the present invention aims at affording a more rapid and direct response of the feeding conveyor by controlling simultaneously the supply to a conveyor drive motor and to a feed regulating motor, to produce feed rate changes which correspond to and coincide with the speed changes of the motor driving the conveyor. An electric circuit arrangement according to the present invention can serve advantageously instead of, or in addition to, the conventional feed control means which operate in dependence upon the weight of material per unit length of conveyor as measured by a weighing mechanism. If the said two controls are employed simultaneously, the electric circuit control may operate automatically when the speed of the motor driving the conveyor is changed in order to change the discharge rate from the conveyor, and the weight sensing control may operate in response to transient and fortuitous fluctuations of the feed, thereby to maintain the feed rate at an average level as required in accordance with a value set for the rate of discharge from the conveyor. However, as will be seen, the weight responsive means can also function to control a conveyor feed rate when an additional means is provided to adjust individually the speed of a conveyor which cooperates with other conveyors. Thus, simultaneous control of several conveyors can be obtained by an electrical circuit controlling the supply to the armatures of said conveyor drive and feed regulating motors, the weight responsive feed control functioning to adjust the field excitation of the feed motor when the speed of the conveyor drive motor is varied by said additional means.

Thus the present invention is particularly advantageous where several conveyors deliver to a common station and more than one feeder is provided to supply materials of different kinds or grades to at least one of said several conveyors. The invention makes it possible to maintain automatically the proportion between the weights of different materials and/or different grades of material while the total delivery from the several conveyors is varied, or the speed of one or more of the conveyors may be varied individually in order to change the relationship between the discharge rates of the several conveyors, thereby to change the nature of the mixture arriving at a common delivery station.

Each one of the several conveyors may carry an individual material, or several feeders may be used to supply a single conveyor with different grades of the same individual material.

Accordingly this invention resides in a conveyor plant having at least one conveyor to which material is fed by at least one feeder, characterized by an electric motor driving said conveyor, another electric motor controlling the feeding action of said feeder, a main amplifier supplying the armatures of said two motors and having a control winding supplied through a main potentiometer from a direct current source, an auxiliary amplifier supplying a field winding of the first electric motor which drives the said conveyor, said auxiliary amplifier also having a control winding connected through another potentiometer to the output of said main amplifier, another control winding of said auxiliary amplifier being supplied from a tachometer generator which is shaft coupled to said first electric motor, and an additional means being provided for controlling, in dependence upon the weight of material carried per unit length of the said conveyor, the motor which determines the feeder action.

In the following the term turntable is meant to embrace feeder turntables and also equivalent feeder means which are arranged to supply to the conveyor material to be delivered at the delivery end thereof, and which are controlled in accordance with this invention.

In a preferred embodiment the main potentiometer is supplied from the direct current source through a master potentiometer and this master potentiometer can be arranged in the supply circuit of at least two main potentiometers each controlling a main amplifier which serves to feed with its output at least two motors, one operating as a conveyor drive and the other or others as conveyor feed control motors as will be later described.

As is known, the delivery rate, that is the weight of material delivered per time unit, generally depends upon the speed of a conveyor which carries a constant weight per unit length, or if the conveyor moves at a constant speed, upon the feed rate, that is the rate of material transferred per time unit to the conveyor, to be delivered from the conveyor end.

The accompanying drawing shows diagrammatically and by way of example a circuit arrangement embodying the invention, said arrangement being shown for only one of several identical conveyor groups or systems which discharge to a common station.

Referring to the drawing, conductor lines L1, L2 are connected to the output of a magnetic amplifier MST, of any kind well known in the art and particularly one of the kind which is generally known under the trade name "magnestat." Said magnetic amplifier or power "magnestat" MST is fed from three-phase main lines indicated at AC, and serves to supply a motor MT1 arranged to drive a conveyor CR. The lines L1, L2 also supply the armature of another motor MT2 arranged to control the feed to the conveyor, by driving a feeding turntable FTT. While only one motor MT2 is shown any desired number of such feeder or "turnable" motors can be connected to the lines L1, L2 to control individually the transfer rates of materials, of different grades for instance, which are fed or transferred from separate supply stations to the individual ones of several conveyors, said conveyors delivering the total of said materials to a common station or conveyor.

The magnetic amplifier MST has, as is known in the art, a control winding CL1, and this winding is here supplied through a first or master potentiometer PT1 and a second potentiometer PT2 from a constant voltage D.C. source indicated by the conductors E+, E—. The potentiometer PT1 provides a first control means, and the potentiometer PT2 a second control means. The magnetic amplifier MST simultaneously controls by its output signal the conveyor motor MT1 and all the motors MT2 controlling the feeding rates to the conveyor. Conducting lines C, D are provided to direct the output of potentiometer PT1, which produces the first control signal, to a magnetic amplifier connected in a circuit which is identical with that shown, for controlling in the same plant another one of the conveyors with its feeders in the same manner as just described.

Across the output conductors L1, L2 of the magnetic amplifier MST there is connected a third potentiometer PT3 to operate as the third control means affording the third adjustable voltage which is applied to a control winding CL2 of a magnetic amplifier MA, the output of the amplifier controlling the excitation of a field winding F1, and thereby the speed of motor MT1 which drives the conveyor. Another control winding CL3 of the magnetic amplifier MA is energised from a tachometer generator TG which is mechanically coupled to the motor MT1 to develop a feedback signal. Thus the components CL3 and TG coact to provide a feedback signal to regulate the conveyor speed as selectively determined by the control potentiometers.

In order to prevent the field energization of the motor from falling to an undesirable value an additional and predetermined voltage is applied to the field winding F1 through a resistor RE from a direct current source indicated by the conductors FV+ and FV−.

The armature of the motor MT2, which drives a turntable feeding the conveyor, is supplied through the conductors L1, L2 from the magnetic amplifier MST, and a control device of any suitable and conventional kind diagrammatically indicated at W is provided to maintain constant in well-known manner the weight of material carried per unit length of the conveyor. The device W controls the energization of a field winding F2 of the motor MT2 through a magnetic amplifier MAa.

The winding F2 is connected through a resistor RE′ to the lines FV+, FV−, to prevent undesirable field conditions as explained for winding F1.

It will be seen that the potentiometer PT2 affords a second control signal which individually controls the conveyor speed and feed of each one of the several conveyors, of which one is shown only, thus permitting variation of the mutual relationships between the deliveries of the several conveyors. By changing relative control positions of the potentiometers PT2 associated individually with two or more conveyors the mutual relationship of the delivery rates of the conveyors, and thereby the proportions of component materials transferred by these conveyors to a common conveyor or station can be adjusted. The potentiometer PT3 in combination with the device W, which itself may be settable to influence the transfer rate at which material is fed to the group conveyor, makes it possible to vary individually the transfer rates at different supply stations along the same conveyor. Thus the proportions of different materials or grades of the same material, for instance grades of particle size can be varied to obtain a desired mixture of said materials to be delivered by one or each of the several conveyors.

Modifications are possible without departing from the invention. The means for controlling the rate of transfer from the feeders to the conveyors may be of any suitable and conventional kind, provided they are controlled as suggested by the present invention. In lieu of the magnetic amplifier means shown by way of example, equivalent control means, including other amplifiers which provide a similar effect can be used, for instance rotating D.C. machines, the output of which is proportionate to an input signal and is greatly amplified with respect thereto. Such machines are generally known under the name of amplidyne.

What we claim is:

1. A conveyor plant comprising at least one conveyor to which material is fed by at least one feeder, a first electric motor for driving said conveyor, a second electric motor for driving said feeder, a first control amplifier having an output supplying the armatures of said first and second motors and having a control winding supplied through a first potentiometer connected to a D.C. source, a second control amplifier having an output supplying a field winding of said first electric motor, said second amplifier having a control winding supplied through a second potentiometer connected across the output of said first control amplifier, another control winding of said second amplifier being supplied by a tachometer generator connected to be driven by said first electric motor, and additional means for controlling the field of said second electric motor in addition to the armature control of said second motor, said additional control means exercising a degree of control dependent upon weight of material carried per unit length of said conveyor.

2. A plant as claimed in claim 1, wherein said additional control means comprising a third control amplifier arranged to supply excitation current to a field winding of said second motor.

3. A plant as claimed in claim 1, wherein the field windings of said first and second motors are individually connected, each in series with a resistor, across a separate D.C. source.

4. A plant as claimed in claim 1, wherein said first potentiometer is supplied from the D.C. source through a master potentiometer.

5. A plant as claimed in claim 4, wherein said master potentiometer is connected to control current supply to at least two said first potentiometers, each of said potentiometers controlling, through its associated first control amplifier, at least two motors driving said conveyor and said feeder respectively.

6. A plant as claimed in claim 1, wherein said control amplifiers are magnetic amplifiers.

7. A plant as claimed in claim 1, wherein said control amplifiers are rotary machines of known type in which a small input signal produces a proportionate but greatly amplified output signal.

References Cited in the file of this patent

UNITED STATES PATENTS

| | | |
|---|---|---|
| 1,922,883 | Crago | Aug. 15, 1933 |
| 2,808,922 | Lutman | Oct. 8, 1957 |
| 2,883,036 | Fox et al. | Apr. 21, 1959 |
| 2,888,129 | Chapman | May 26, 1959 |